US010459166B2

(12) United States Patent
Collins

(10) Patent No.: US 10,459,166 B2
(45) Date of Patent: Oct. 29, 2019

(54) OPTICAL COUPLING SCHEME

(71) Applicant: CALIOPA N.V., Zwijnaarde (BE)

(72) Inventor: Tom Collins, Munich (DE)

(73) Assignee: CALIOPA N.V., Zwijnaarde (BE)

( * ) Notice: Subject to any disclaimer, the term of this patent is extended or adjusted under 35 U.S.C. 154(b) by 0 days.

(21) Appl. No.: 15/945,064

(22) Filed: Apr. 4, 2018

(65) Prior Publication Data

US 2018/0231714 A1 Aug. 16, 2018

Related U.S. Application Data

(63) Continuation of application No. PCT/EP2016/074032, filed on Oct. 7, 2016.

(30) Foreign Application Priority Data

Oct. 9, 2015 (EP) ..................................... 15189197

(51) Int. Cl.
*G02B 6/26* (2006.01)
*G02B 6/12* (2006.01)
*G02B 6/122* (2006.01)

(52) U.S. Cl.
CPC ........... *G02B 6/26* (2013.01); *G02B 6/12002* (2013.01); *G02B 6/12004* (2013.01); *G02B 6/1228* (2013.01); *G02B 6/1223* (2013.01)

(58) Field of Classification Search
CPC ........ G02B 6/1228; G02B 6/26; G02B 6/262; G02B 6/305
See application file for complete search history.

(56) References Cited

U.S. PATENT DOCUMENTS 7,221,825 B2 * 5/2007 Reed .................. G02B 6/12002
385/129
7,369,727 B2 * 5/2008 Shih ...................... B82Y 20/00
385/129

(Continued)

FOREIGN PATENT DOCUMENTS

CN 101641622 A 2/2010
CN 102621630 A 8/2012

(Continued)

OTHER PUBLICATIONS

Bauters et al., "Integration of Ultra-Low-Loss Silica Waveguides with Silicon Photonics," IEEE Photonics Conference, XP032269277, pp. 701-702, Institute of Electrical and Electronics Engineers, New York, New York (Sep. 23, 2012).

(Continued)

*Primary Examiner* — Daniel Petkovsek
(74) *Attorney, Agent, or Firm* — Leydig, Voit & Mayer, Ltd.

(57) ABSTRACT

A waveguide structure for optical coupling is provided. The waveguide structure includes a first waveguide embedded in a cladding of a lower refractive index than the first waveguide, a second waveguide of a higher refractive index than the cladding, and an intermediate waveguide. The first waveguide and the second waveguide are physically arranged at the same side of the intermediate waveguide to establish an optical coupling between the first waveguide and the second waveguide through the intermediate waveguide. The first waveguide material has a refractive index value smaller than or equal to 3.

14 Claims, 10 Drawing Sheets

(56) References Cited

U.S. PATENT DOCUMENTS

| | | | | |
|---|---|---|---|---|
| 8,615,148 | B2* | 12/2013 | Chen | G02B 6/1228 385/43 |
| 8,787,712 | B2* | 7/2014 | Grondin | B82Y 20/00 385/14 |
| 9,310,558 | B2* | 4/2016 | Huang | G02B 6/26 |
| 9,746,607 | B2* | 8/2017 | Collins | G02B 6/1228 |
| 9,915,782 | B2* | 3/2018 | Ahn | G02B 6/1228 |
| 2003/0068152 | A1* | 4/2003 | Gunn, III | B82Y 20/00 385/129 |
| 2003/0081902 | A1 | 5/2003 | Blauvelt et al. | |
| 2003/0173208 | A1 | 9/2003 | Pan et al. | |
| 2005/0213873 | A1* | 9/2005 | Piede | G02B 6/12004 385/14 |
| 2007/0110369 | A1 | 5/2007 | Blauvelt et al. | |
| 2009/0016399 | A1 | 1/2009 | Bowers | |
| 2010/0040327 | A1 | 2/2010 | Deki et al. | |
| 2011/0116741 | A1* | 5/2011 | Cevini | G02B 6/1228 385/28 |
| 2013/0315536 | A1 | 11/2013 | Huang | |
| 2014/0153600 | A1 | 6/2014 | Luo et al. | |
| 2014/0233881 | A1 | 8/2014 | Hatori et al. | |
| 2015/0010266 | A1 | 1/2015 | Webster et al. | |
| 2017/0075063 | A1* | 3/2017 | Brouckaert | G02B 6/126 |

FOREIGN PATENT DOCUMENTS

| | | |
|---|---|---|
| EP | 2685297 A1 | 1/2014 |
| EP | 3091379 A1 | 11/2016 |
| TW | 201348768 A | 12/2013 |
| WO | 2009106139 A1 | 9/2009 |
| WO | 2014009029 A1 | 1/2014 |

OTHER PUBLICATIONS

Duan et al., "Integrated Hybrid III-V/Si Laser and Transmitter," International Conference on Indium Phosphide and Related Materials (IPRM), XP032297565, pp. 16-19, Institute of Electrical and Electronics Engineers, New York, New York (Aug. 27, 2012).

Yamada et al., "Microphotonics Devices Based on Silicon Wire Waveguiding System," IEICE Trans. Electron, vol. E87-C, No. 3, XP001190111, pp. 351-358 (Mar. 2004).

Tsarev et al., "Peculiarity of Multi-Splitting Filtering Technology," IEEE International Conference on Actual Problems of Electronics Instrument Engineering (APEIE), pp. 452-455, XP002755799, Institute of Electrical and Electronics Engineers, New York, New York (2014).

Sun et al., "Adiabaticity criterion and the shortest adiabatic mode transformer in a coupled-waveguide system," Optics Letters, vol. 34, No. 3, pp. 280-282 (Feb. 1, 2009).

Piels et al., "Low-Loss Silicon Nitride AWG Demultiplexer Heterogeneously Integrated with Hybrid III-V/Silicon Photodetectors," IEEE Journal of Lightwave Technology, vol. 32, No. 4, pp. 817-823, Institute of Electrical and Electronics Engineers, New York, New York (Feb. 15, 2014).

Roelkens et al., "Laser emission and photodetection in an InP/InGaAsp layer integrated on and coupled to a Silicon-on-insulator waveguide circuit," Optics Express, vol. 14, No. 18, The Optical Society (2006).

Chang et al., "1310nm silicon evanescent laser," Optics Express, vol. 15, No. 18, The Optical Society (2007).

Doerr et al., "Eight-Channel $SiO_2/Si_3N_4/Si/Ge$ CWDM Receiver," IEEE Photonics Technology Letters, vol. 23, No. 17, pp. 1201-1203, Institute of Electrical and Electronics Engineers, New York, New York (Sep. 1, 2011).

Chen et al., "Monolithically Integrated 40-Wavelength Demultiplexer and Photodetector Array on Silicon," IEEE Photonics Technology Letters, vol. 23, No. 13, pp. 869-871, Institute of Electrical and Engineers, New York, New York (Jul. 1, 2011).

Huang et al., "Ultra-low Loss CMOS Compatible Multi-Layer $Si_3N_4$-on-SOI Platform for 1310nm Wavelength," Optical Fiber Communications Conference and Exhibition, The Optical Society (2015).

Poon et al., "Integrated Photonic Devices and Circuits in Multilayer Silicon Nitride-on-Silicon Platforms," Optical Fiber Communications Conference and Exhibition, The Optical Society (2015).

CN 201680057295.3, Office Action, dated Sep. 2, 2019.

* cited by examiner (a)

Side view (b)

Top view

Side view (a) Top view (b)

Side view

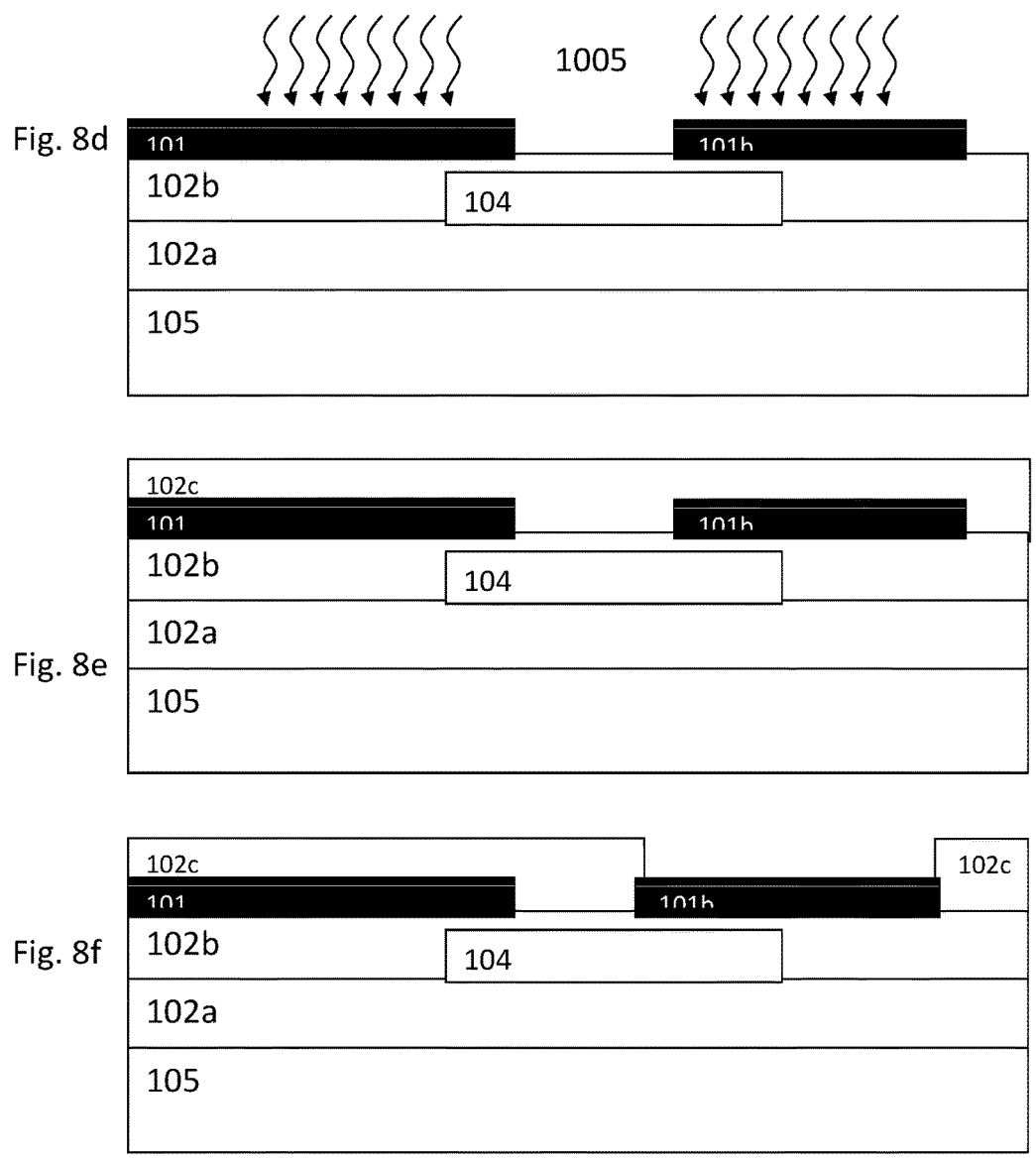

OPTICAL COUPLING SCHEME

CROSS REFERENCE TO RELATED APPLICATIONS

This application is a continuation of International Application No. PCT/EP2016/074032, filed on Oct. 7, 2016, which claims priority to European Patent Application Number 15189197.5, filed on Oct. 9, 2015. The disclosures of the aforementioned applications are hereby incorporated by reference in their entireties.

TECHNICAL FIELD

The present invention relates to the field of photonic integrated circuits (PIC). In particular, the present invention describes an optical coupling scheme for optically coupling between different waveguides on the same chip. To this end, the present invention presents a structure comprising multiple waveguides on the same chip, a chip including such a waveguide structure, and a method of fabricating the multiple waveguide structure.

BACKGROUND

Silicon photonics is rapidly gaining importance as a generic technology platform for a wide range of applications. Such applications include, for instance, telecom, datacom, interconnect and sensing. Silicon photonics allows implementing photonic functions through the use of complementary metal-oxide-semiconductor (CMOS) compatible wafer-scale technologies on high quality, low cost silicon substrates.

However, especially for telecom applications it is difficult to meet all performance requirements, when using conventional silicon passive devices. Instead, it has been found that a dramatically improved performance can be achieved by using high quality silicon nitride (SiN) technology, which is still a CMOS compatible wafer-scale technology. As a drawback, active devices cannot be fabricated using SiN.

One option to overcome this drawback is to monolithically integrate SiN waveguides with active devices fabricated using silicon, i.e. devices formed in silicon waveguides. However, high temperatures are necessary to ensure a high quality of the SiN waveguides. Therefore the silicon active devices must be formed after the SiN has been annealed (and therefore on top of the SiN). This is described in WO 2014/009029 A1. Therein a mono-crystalline silicon layer is wafer bonded above a (planarized) SiN waveguide. Although the number of process steps is comparable to the standard silicon on insulator (SOI) program this approach does involve a difficult wafer bonding step.

To achieve high wafer bond yields, stringent cleanliness and planarization is required, which makes the fabrication of such integrated devices difficult and expensive.

Alternatively, active devices can be transfer printed or flip-chip bonded to the silicon nitride PIC. High quality SiN films are both CMOS compatible and offer high performance passive devices rivaling what can be achieved with silica PLC's but in much smaller die. III-V material offers high quality active photonic devices. The problem is to find a way to efficiently couple light between SiN waveguides and III-V waveguides, such as indium phosphide (InP). Ideally, to make the platform suitable for active devices, such as lasers, modulators and detectors, an optical coupling scheme which adiabatically transfers light between the different waveguides is preferred. However, it is difficult to transfer light from an III-V device directly to the SiN without extremely narrow tapers and/or vertical tapering. Consequently a silicon interlayer is often used.

In Sun et al, "Adiabaticity criterion and shortest adiabatic mode transformer in a coupled waveguide system", OPTICS LETTERS, Vol. 34, No. 3, Feb. 1, 2009, the criteria that are required for adiabatic coupling are summarized. However the large refractive index difference between SiN and III-V material means that the taper on the III-V waveguide would need to be very narrow, for instance a width less that 100 nm, and/or very thin, for instance a thickness lower than 200 nm, to meet these criteria. Neither of these requirements is easy to achieve with processing techniques common in III-V wafer fabrication.

Therefore one barrier to integration of III-V actives to SiN passives is the difficulty in transferring light between the two waveguides due to the large refractive index contrast and consequently the need to define a very thin III-V tip, for instance smaller than 100 Nanometers. In Piels et al, "Low loss Silicon nitride AWG demultiplexer heterogeneously integrated with III-V photodetectors", Journal of Lightwave Technology, Vol. 32, No. 4, Feb. 15, 2014, an alternative approach is described in which silicon as an intermediate layer is used. Although silicon has a refractive index comparable to III-V materials, it is easy to fabricate tapers which allow coupling to SiN. The silicon taper can be defined using CMOS fabrication techniques and the tolerances mentioned above are easily achievable, especially when using 192 Nanometers DUV (deep ultraviolet light) stepper technology and appropriate etch equipment. The taper required in the III-V waveguide to couple adiabatically to the silicon waveguide is well within the capability of most III-V fabrications, particularly if the silicon thickness is greater than 300 nm. A disadvantage of the approach described in this paper is that a wafer bonding step is required to add the mono-crystalline silicon layer above the planarized SiN layer. In this case the SiN is extremely thin, for instance in a range of 70 nm to 100 nm and this does make planarization easier. However, the planarization becomes much harder with thicker SiN waveguide layers, for instance with a thickness in the range of 300 nm to 400 nm.

In US 2009/016399 A1 an evanescent coupling of light from silicon waveguides to III-V photodetectors is described. Also in Roelkens et al, "Laser emission and photodetection in an InP/InGaAsP layer integrated on and coupled to a Silicon-on-Insulator waveguide circuit", Optics Express, Vol. 14, No. 18, 2006 or in Fang et al, "1310 nm evanescent laser", Optics Express, Vol. 15, No. 18, 2007 lasers, tunable lasers, modulators and detectors in III-V heterogeneously integrated on an SOI platform have been described. However this platform assumes silicon waveguides will be used for passive structures. There is no consideration how to achieve low loss or high performance passive devices.

A barrier to integration of III-V actives to silicon nitride passives is the difficulty in transferring light between the two waveguides due to the large refractive index contrast and the need to define a very narrow (<100 nm) wide III-V tip.

The limitation of using silicon waveguides to fabricate passive devices has been recognized for some time. In Doerr et al, "Eight-Channel SiO(2)/Si(3)N(4)/Si/Ge CWDM Receiver", IEEE PHOTONICS TECHNOLOGY LETTERS, Vol. 23, No. 17, DOI: 10.1109/LPT.2011.2158091, published in Sep. 1, 2011 or in Chen et al, "Monolithically integrated 40-channel multiplexor and photodetector array on silicon", IEEE photonics Technology Letters, Vol. 23, No. 13, 2011 a plasma-enhanced chemical vapor deposition (PECVD) SiN deposited on top of the silicon is used. This approach is gaining popularity at the OFC 2015, see for instance Huang et al, "Ultra-low loss CMOS compatible multi-layer Si3N4-on-SOI platform for 1310 nm Wavelength", W4A.5 or Poon et al, "integrated photonic devices and circuits in hybrid silicon platforms", Th3F.1. Thus, the SiN is integrated monolithically above the Silicon on insulator (SOI). The disadvantage of this approach is that the temperature budget for the silicon nitride processing is limited as the SOI active devices have already been formed. This means that the refractive index and uniformity control and absorption around 1520 nm is much worse than would be the case for a low pressure chemical vapor deposition (LPCVD) SiN waveguide.

SUMMARY

As is evident from the above description of the conventional optical coupling schemes a problem is that either the coupling of light is so far not achieved in such a way that, firstly, the coupling efficiency is high (i.e. that the optical coupling loss is low) over a wide wavelength band or passive device performance is compromised by using either silicon waveguides or low temperature SiN waveguides OR when integrating SiN passive devices with active devices on an integrated platform. The manufacturing costs are high because all low loss schemes proposed to date involve wafer bonding over patterned wafers.

The present invention has the object to provide a waveguide structure for optical coupling and a method for fabricating a waveguide structure for optical coupling with reduced manufacturing costs and/or reduced manufacturing steps.

In particular the present invention proposes a waveguide structure and a fabrication method of the waveguide structure, in order to realize a novel low-loss optical coupling scheme. The coupling scheme is specifically suited for transfer printing or flip-chip bonding active devices to a SiN PIC. To this end, the present invention realizes a waveguide structure, which waveguide structure allows transferring light, particularly transferring the light adiabatically, from a first waveguide to a second waveguide through an intermediate waveguide. In this way it is possible to realize optical adiabatic coupling within a chip or from chip to chip, preferably comprising different waveguide materials.

The present invention improves conventional optical coupling schemes including one waveguide suitable for high quality passive devices and a second waveguide material suitable for active devices. As an example, the present invention includes a III-V waveguide to SiN waveguide coupling scheme which has low optical coupling losses.

A first aspect of the present invention provides a waveguide structure for optical coupling. The waveguide structure comprises a first waveguide that is embedded in a cladding of a lower refractive index than the first waveguide, a second waveguide of a higher refractive index than the cladding and an intermediate waveguide. The first waveguide and the second waveguide are arranged, i.e. physically arranged, at the same side of the intermediate waveguide to establish an optical coupling between the first waveguide and the second waveguide through the intermediate waveguide. The first waveguide has a refractive index value smaller than or equal to 3, preferably smaller than or equal to 2.5, and is optimized to allow fabrication of high quality passive optical devices.

Using a first waveguide with a refractive index smaller than or equal to 3, preferably smaller than or equal to 2.5, allows a fabrication technology of passive devices with better optical properties than in a technology that uses material with a refractive index range is above 3, for instance silicon or III-V technology as process tolerances are more relaxed. The first waveguide material may also have further characteristics such as low material absorption at the relevant wavelengths, a lower temperature dependency of the refractive index, easily controllable and reproducible refractive index, and be able to be deposited and patterned using CMOS compatible processes.

The second waveguide material is optimized for a fabrication technology of at least an active device. The integration of the different waveguide technologies on a single chip will enable highly functional photonic integrated circuits.

The first waveguide and the second waveguide are arranged at the same side of the intermediate waveguide to establish an optical coupling between the first waveguide and the second waveguide through the intermediate waveguide. By arranging the first waveguide and the second waveguide at the same side of the intermediate waveguide, a compact optical coupling scheme is achieved with less manufacturing steps compared to conventional manufacturing methods.

In a first implementation form of the waveguide structure of the first aspect, the first waveguide, the second waveguide and the intermediate waveguide each comprise a tapered end. A tapered end of the first waveguide is arranged to face a first tapered end of the intermediate waveguide for establishing an optical coupling between the first waveguide and the intermediate waveguide. A second tapered end of the intermediate waveguide is arranged to face a tapered end of the second waveguide for establishing an optical coupling between the intermediate waveguide and the second waveguide.

Thus, light can efficiently and adiabatically be transferred from the first waveguide to the second waveguide over a relatively short length. Thereby, the first waveguide and the intermediate waveguide preferably extend at least substantially parallel to each other in one direction, and the tapered end of the first waveguide overlaps with the first tapered end of the intermediate waveguide in said extension direction. More preferably the tapered end of the first waveguide overlaps with the first tapered end of the intermediate waveguide in said extension direction by about 500 μm or less, even more preferably by about 400 μm or less, most preferably by about 300 μm or less.

Thereby, the second waveguide and the intermediate waveguide preferably extend at least substantially parallel to each other in one direction, and the tapered end of the second waveguide overlaps with the second tapered end of the intermediate waveguide in said extension direction. More preferably the tapered end of the second waveguide overlaps with the second tapered end of the intermediate waveguide in said extension direction by about 500 μm or less, even more preferably by about 400 μm or less, most preferably by about 300 μm or less.

Under extension direction is understood in this disclosure the direction along which the first/second waveguide or a portion thereof run parallel to or overlap the intermediate waveguide. Specifically, extension direction refers to the tapered ends of the waveguides: two tapered ends, through which an optical coupling between waveguides is established, will extend in the same direction so as to run essentially parallel. In other words the tapered end of the first waveguide and the first tapered end of the intermediate waveguide will extend along the same direction. Similarly, the tapered end of the second waveguide and the second tapered end of the intermediate waveguide will extend along the same direction.

In a second implementation form of the waveguide structure of the first aspect as such or according to any of the previous implementation forms, the intermediate waveguide is formed using a mono-crystalline layer of a silicon-on-insulator wafer substrate. The first waveguide and the second waveguide are arranged on a side of the intermediate waveguide that is opposite to the side facing the silicon-on-insulator wafer substrate.

Thus, no additional wafer bond step is required to obtain mono-crystalline silicon above a SiN layer and thus the manufacturing process is less complex. Using this integration strategy, the adiabatic coupling between the first waveguide and the second waveguide comprises optical coupling losses of around 0.2 Decibel over a relatively wide wavelength range. In summary, the same optical performance can be achieved using the scheme described in the prior art coupling schemes but in this case the processing is much simpler, thus cheaper and a higher yield is obtained.

In a third implementation form of the waveguide structure according to the first aspect as such or according to any of the previous implementation forms of the first aspect, the first waveguide is made of a material with a refractive index of 1.7 or higher, preferably the first waveguide is made of a material with a refractive index in the range of 1.7 to 2.5, more preferably the first waveguide is made of a material with a refractive index in the range of 1.7 to 2.3. A first waveguide material is preferably SiN, silicon oxynitride, silicon carbide, tantalum pentoxide, aluminum nitride and/or tellurium dioxide. This enables significantly improved performance, in particular for telecom applications, and is furthermore fully compatible with CMOS processing. Such a first waveguide material ensures passive devices with better optical properties than in a technology, where the refractive index range is above 3. Preferably, the cladding has a refractive index of 1.5 or lower. Consequently, the first waveguide is a medium index contrast waveguide, i.e. with a medium index contrast between the waveguide and cladding.

In a fourth implementation form of the waveguide structure according to the first aspect as such or according to any of the previous implementation forms of the first aspect, the second waveguide is made of a group III-V material, or a combination of different III-V materials. A III-V material—also called III-V compound—is a compound of the chemical materials main group III, such as earth metal or boron group, and chemical materials main group V, such as nitrogen phosphorus-group. A combination of a group III and a group V material leads to the electrical conductivity of semiconductors. The III-V compounds are therefore of great importance for fabrication of active devices for PIC's, such as detectors, modulators or lasers. The III-V compounds comprise a refractive index value above 3. Preferably, the group of III-V materials can include active devices as well as passive devices. Thus, different III-V materials can preferably by combined in the second waveguide layer, preferably above either a silicon layer.

In a fifth implementation form of the waveguide structure according to the first aspect as such or according to any of the previous implementation forms of the first aspect, the second waveguide includes at least one active device. An active device is a device that processes or responds to light in a way which is influenced by an electrical input. For instance a laser emits light when an appropriate bias voltage is applied, a detector generates electrical current when light falls on it, a modulator will convert electrical pulses into optical pulses. Such devices are for instance built from InP, GaAs, GaP, GaAsP, AlGaAs, AlInGaP and GaN, Si, SiGe. Because of their band gaps etc., these materials have a refractive index value above 3 which makes it difficult to use them to fabricate high quality passive devices.

In a sixth implementation form of the waveguide structure according to any of the previous implementation forms of the first aspect, the first waveguide has a thickness in the range of 70 nm to 700 nm. The tapered end of the first waveguide at its thinnest part has a width in the range of 100 nm to 2 µm. Such tapered ends enable adiabatic coupling with particularly low optical coupling losses.

In a seventh implementation form of the waveguide structure according to any of the previous implementation forms of the first aspect, the intermediate waveguide has a thickness in the range of 200 nm to 500 nm. The first tapered end of the intermediate waveguide has a width less than 150 nm and the second tapered end of the intermediate waveguide has a width in the range of 100 nm to 300 nm. Such tapered ends enable adiabatic coupling with particularly low optical coupling losses.

In an eighth implementation form of the waveguide structure according to any of the previous implementation forms of the first aspect, the second waveguide has a thickness in the range of 200 nm to 3 µm, preferably a thickness in the range of 200 nm to 2 µm. The tapered end of the second waveguide at its thinnest part has a width in the range of 150 nm to 500 nm.

Such waveguide structures enable a good light transmission performance, and optical coupling between the waveguides with low optical loss.

In a ninth implementation form of the waveguide structure according to the first aspect as such or according to any of the previous implementation forms of the first aspect, the intermediate waveguide is formed by etching the top silicon layer of a silicon-on-insulator (SOI) wafer.

A second aspect of the present invention provides a method of fabricating a waveguide structure for optical coupling, comprising the steps of forming a silicon-on-insulator wafer substrate, forming an intermediate waveguide within the thin silicon layer of the silicon-on-insulator wafer substrate, covering the intermediate waveguide with a cladding and planarizing the cladding, forming a first waveguide on top of the planarized cladding, wherein the cladding comprises a lower refractive index than the first waveguide material, annealing the formed first waveguide before and/or after patterning of the first waveguide, applying an overcladding material for embedding the first waveguide, locally removing the overcladding material to a thickness less than 200 nm above the intermediate waveguide and forming a second waveguide in areas, where the overcladding material is removed, wherein the second waveguide comprises a higher refractive index than the overcladding.

Thus, mono-crystalline silicon is used as an intermediate waveguide between a first waveguide and a second waveguide. This approach avoids the need for a wafer bonding step. The planarization above the first waveguide is easier as silicon is thinner than the SiN layer and requirements for planarization are relaxed without any subsequent wafer bonding step. Thus, an integrated multiple waveguide structure is obtained in an easier manner so passive devices can be fabricated using a waveguide material that is optimized for passive devices and active devices can now be fabricated using a material optimized for active devices.

In a first implementation form of the method of the second aspect, the step of removing the overcladding layer is achieved by locally using the first waveguide material as an etch stop layer before itself locally being removed.

In a second implementation form of the method according to the second aspect as such or according to any of the previous implementation forms of the second aspect, the second waveguide is made of a group III-V material, or a combination of different III-V materials.

In a third implementation form of the method according to the second aspect as such or according to any of the previous implementation forms of the second aspect, the second waveguide and/or the first waveguide are made of silicon (Si) or silicon-germanium (SiGe).

In order to couple a III-V material to such a first waveguide material, the overcladding layer is removed in that area. The first waveguide layer can be used as an effective etch stop. It should be realized that no active are included in the first waveguide layer. It should be realized that any active devices or passive devices formed in the first waveguide layer or in the intermediate waveguide layer do not require a semiconductor junction or other features sensitive to temperatures up to 1150 degrees Celsius. Thus, the temperature budget for the first waveguide forming is not restricted even with silicon already patterned. Additionally, an optical coupling from a III-V device to the first waveguide material is possible even if the silicon is under the first waveguide. This is because the first waveguide is used as an etch stop when locally removing the top cladding and is then itself removed. Using the first waveguide as the etch stop avoids the deposition and patterning of a dedicated etch stop layer and thus, the manufacturing costs are reduced.

In a fourth implementation form of the method according to the second aspect as such or according to any of the previous implementation forms of the second aspect, the first waveguide layer is a Low Pressure Chemical Vapor Deposition, LPCVD, Silicon Nitride layer which has been annealed at high temperatures, for example in the range of 1150 degrees Celsius to 1200 degrees Celsius. This material is ideally suited for the fabrication of high quality passive devices.

In a fifth implementation form of the method according to the second aspect as such or according to any of the previous implementation forms of the second aspect, the second waveguide is formed using a transfer printing step. Using this technique the second waveguide can be fabricated comprising completely functional active devices preferably with appropriate tapers prior to being transfer printed onto the chip.

In a sixth implementation form of the method according to the second aspect as such or according to any of the previous implementation forms of the second aspect, the second waveguide is formed by bonding appropriate epitaxial layers of III-V material.

Note that using either the fifth or sixth implementation the second waveguide can comprise different materials at different physical places on the chip. Therefore it is possible to use material optimized for lasers at one place on the chip and a different second waveguide material optimized for modulators at a different physical place on the chip.

In a seventh implementation form of the method according to the second aspect as such or according to any of the previous implementation forms of the second aspect, a further planarizing step to the wafer is applied after the second waveguide has been formed and contacts to any active device formed in the second waveguide layer are then added. By planarizing the wafer in this way it is then possible to closely integrate the electronics by flip-chip or copper stud bumping, 3D integration etc. This can greatly reduce parasitics potentially leading to improved radio frequency (RF) performance and lower power consumption.

In an eighth implementation form of the method of the second aspect as such or according to any of the previous implementation forms of the second aspect, the cladding comprises a lower cladding layer and an upper cladding layer, which cladding layers sandwich the first waveguide.

In a ninth implementation form of the method of the second aspect as such or according to any of the previous implementation forms of the second aspect, the first waveguide is made of a material with a refractive index value of 3, preferably smaller than or equal to 2.5 or lower. Preferably, the refractive index of the first waveguide material is 1.7 or higher, more preferably the first waveguide is made of a material with a refractive index in the range of 1.7 to 2.3.

In a tenth implementation form of the method of the second aspect as such or according to any of the previous implementation forms of the second aspect, the first waveguide has a thickness in the range of 70 nm to 700 nm. The tapered end of the first waveguide at its thinnest part has a width in the range of 100 nm to 2 um.

In an eleventh implementation form of the method of the second aspect as such or according to any of the previous implementation forms of the second aspect, the cladding has a refractive index of 1.5 or lower.

In a twelfth implementation form of the method of the second aspect as such or according to any of the previous implementation forms of the second aspect, the intermediate waveguide has a thickness in the range of 200 nm to 500 nm. The first tapered end of the intermediate waveguide has a width less than 150 nm and the second tapered end of the intermediate waveguide has a width in the range of 100 nm to 300 nm.

In a thirteenth implementation form of the method of the second aspect as such or according to any of the previous implementation forms of the second aspect, the second waveguide has a thickness in the range of 200 nm to 2 um. The tapered end of the second waveguide at its thinnest part has a width in the range of 150 nm to 500 nm.

In a fourteenth implementation form of the method of the second aspect as such or according to any of the previous implementation forms of the second aspect, the method further comprises the steps of filling vias and applying a metallization layer to form metal contacts on the surface. Thus, an electrical contact can be made to active devices formed in the second waveguide layer.

In a fifteenth implementation form of the method of the second aspect as such or according to any of the previous implementation forms of the second aspect, the method further comprises process steps to make the wafer compatible with close integration of electronic circuits, e.g. by bumping or flip chip.

The described method of fabricating a PIC is easy to carry out and comprises 4 or 5 mask steps only. The method can be transferred to an advanced CMOS fabrication without difficulty. This is possible since active devices in the second waveguide can be fabricated separately prior to transfer to the chip. In addition any subsequent planarization, interconnect, preparation for flip chip or stud bumping processing could be done in a cheaper microelectromechanical systems (MEMS) fabrication facility where costs may be cheaper than in a modern CMOS foundry.

The method according to the second aspect, and its implementation forms, achieves the same advantages and technical effects than the waveguide structure of the first aspect and its respective implementation forms.

It has to be noted that all devices, elements, units and means described in the present application could be implemented in hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be full formed by eternal entities is not reflected in the description of a specific detailed element of that entity which performs that specific step or functionality, it should be clear for a skilled person that these methods and functionalities can be implemented in respective hardware elements, or any kind of combination thereof.

BRIEF DESCRIPTION OF THE DRAWINGS

The above described aspects and implementation forms of the present invention will be explained in the following description of specific embodiments in relation to the enclosed drawings, in which:

FIGS. 8a to 8j show a stepwise manufacturing scenario for manufacturing a waveguide structure according to the present invention.

DETAILED DESCRIPTION OF EMBODIMENTS

Figure 1:
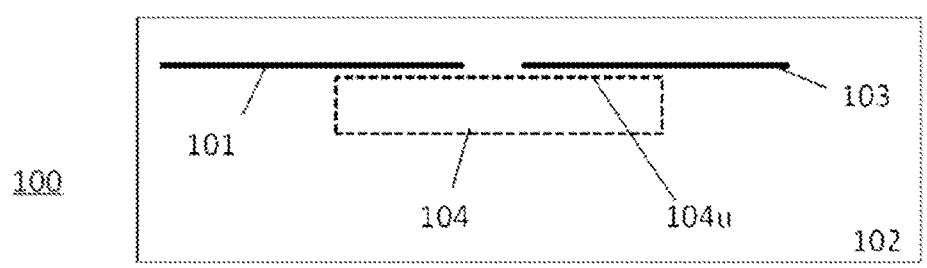
FIG. 1 shows a waveguide structure according to a basic embodiment of the present invention.
Figure 1:
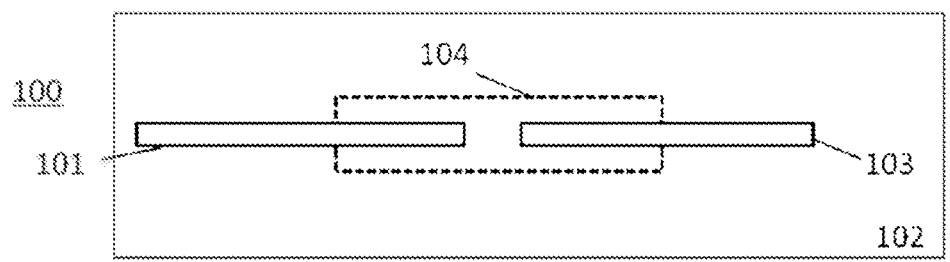

FIG. 1 shows a waveguide structure 100 according to a basic embodiment of the present invention. In particular, FIG. 1 shows in (a) a side view of the waveguide structure 100, and in (b) a top view of the same waveguide structure 100. The waveguide structure 100 includes a first waveguide 101, which is embedded in a cladding 102. The cladding 102 is made of a material that has a lower refractive index than the material of the first waveguide 101. The material of the first waveguide 101 may be, for example, SiN or Silicon Oxynitride $SiO_xN_y$. The material of the cladding 102 may be, for example, $SiO_2$. The cladding 102 may be a single cladding layer, or may consist of several cladding layers, for instance a lower cladding layer and an upper cladding layer sandwiching the first waveguide 101. The cladding 102 may be provided on a substrate, for instance, a silicon substrate.

The waveguide structure 100 also includes a second waveguide 103. The second waveguide 103 is made of a material that has a higher refractive index than the cladding 102. The material of the second waveguide 103 may be, for example, an III-V compound. The second waveguide 103 may be embedded in the cladding 102 or may be provided on top of a lower layer of the cladding 102.

The refractive index of the first waveguide 103 has a value smaller than or equal to 3, preferably smaller than or equal to 2.5. In some implementations, the first waveguide material has a refractive index of 1.8 or higher, while the cladding material has a refractive index of 1.5 or lower. That means, preferably the first waveguide 101 is of a medium index contrast with respect to the cladding 102.

The waveguide structure 100 further includes an intermediate waveguide 104 (dashed line in FIG. 1). The intermediate waveguide 104 may be, for instance, formed within a part of the cladding 102. The intermediate waveguide 104 and the second waveguide 103 may have a refractive index value of above 3 to allow low loss coupling from the second waveguide 103 to the intermediate waveguide 101. The intermediate waveguide 104 is designed and adapted to transfer light from the first waveguide 101 to the second waveguide 103 via the intermediate waveguide 104.

The first waveguide 101 and the second waveguide 103 are physically arranged at the same side 104u of an intermediate waveguide 104 to establish an optical coupling between the first waveguide 101 and the second waveguide 103 through the intermediate waveguide 104. Thus, the intermediate waveguide 104 is arranged beneath the first waveguide 101 and the second waveguide 103 so as to establish an optical coupling with the first and second waveguide, respectively.

As can be seen in (b) of FIG. 1, both the first waveguide 101 and the second waveguide 103 each comprise a first end. Additionally, the intermediate waveguide 104 comprises a first end and a second end. The first end of the first waveguide 101 faces the first end of the intermediate waveguide 104. The first end of the second waveguide 101 faces the second end of the intermediate waveguide 104. The first waveguide 101 and the second waveguide 103 are physically arranged on the same side of the intermediate waveguide 104. All these ends are adapted to exchange light, i.e. they are designed for coupling light, preferably adiabatically, from the first waveguide 101 into the intermediate waveguide 104 and/or from the intermediate waveguide 104 out to the second waveguide 103 or vice versa. Accordingly, light can be transferred with very low losses of <0.2 dB between the first waveguide 101 and the second waveguide 103 via the intermediate waveguide 104.

The intermediate waveguide 104 is particularly designed to transfer light between the first waveguide 101 and the second waveguide 103 over a transition length in extension direction of the waveguides 101 and 103 of about 1 mm or less. Preferably, between the first end of the first waveguide 101 and the first end of the second waveguide 103 a gap may be provided so as to separate the first end of the first waveguide 101 from the first end of the second waveguide 103. The gap between the first end of the first waveguide 101 and the first end of the second waveguide 103 may be of 50 μm or more. Preferably, the intermediate waveguide 104 overlap in extension direction of the waveguides 101 and 103 (i.e. when viewed from the top, see (b) of FIG. 1) each by 500 μm or less, preferably each by about 400 μm or less, more preferably each by about 300 μm or less.

Figure 2:
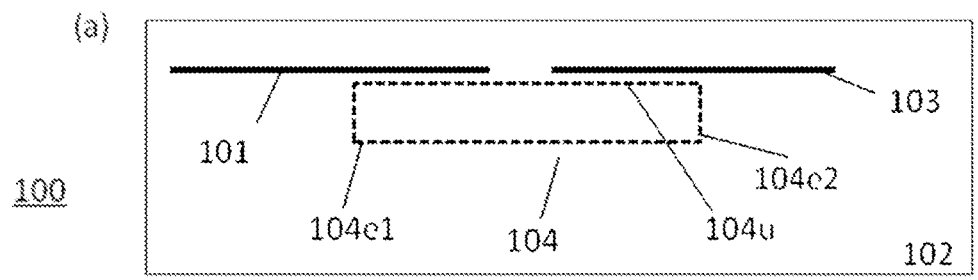
FIG. 2 shows a waveguide structure according to a first specific embodiment of the present invention.
Figure 2:
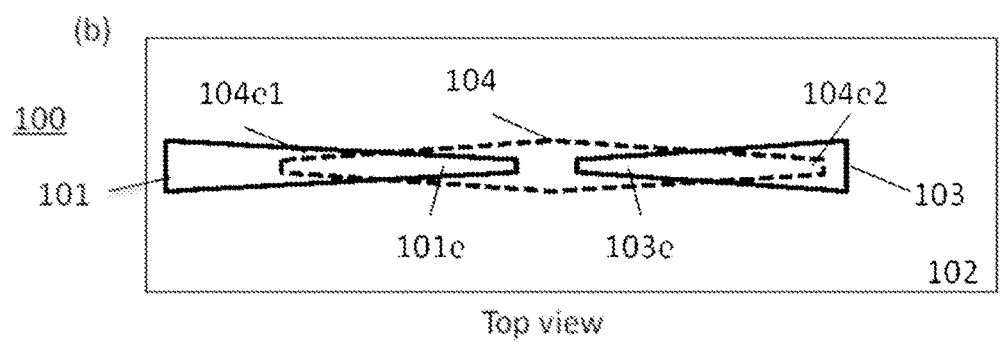

FIG. 2 shows a first specific embodiment of the present invention, which builds on the basic embodiment shown in FIG. 1. The first waveguide 101 comprises a tapered end 101e. The second waveguide 103 comprises a tapered end 103e. The intermediate waveguide 104 comprises a first tapered end 104e1 and a second tapered end 104e2.

The tapered ends 101e and 103e are adapted to exchange light with the tapered ends 104e1 and 104e2 of the intermediate waveguide 104, i.e. are designed for coupling light, preferably adiabatically, into and/or out of the intermediate waveguide 104. Accordingly, light can be transferred with very low losses of <0.2 dB between the first waveguide 101 and the second waveguide 103 through the intermediate waveguide 104.

The intermediate waveguide 104 may be designed to transfer light between the first waveguide 101 and the second waveguide 103 over a transition length in extension direction of the waveguides 101 and 103 of 1 mm or less, preferably close to 500 μm. Preferably, the tapered end 101e of the first waveguide 101 may be at a distance from the tapered end 103e of the second waveguide 103 at the same side of the intermediate waveguide 104. In other words, a gap may be provided between the tapered end 101e of the first waveguide and the tapered end 103e of the second waveguide. In some implementations the gap may be of 50 μm or more. A first tapered end 104e1 of the intermediate waveguide 104 overlaps in extension direction with the tapered end 101e of the first waveguide 101. The first tapered end 104e1 of the intermediate waveguide 104 is arranged to face the tapered end 101e of the first waveguide 101 to establish the optical coupling between the first waveguide 101 and the intermediate waveguide 104, preferably in an adiabatic manner. A second tapered end 104e2 of the intermediate waveguide 104 overlaps in extension direction with the tapered end 103e of the second waveguides 101. The second tapered end 104e2 of the intermediate waveguide 104 is arranged to face the tapered end 103e of the second waveguide 103 to establishing an optical coupling between the intermediate waveguide 104 and the second waveguide 103, preferably in an adiabatic manner.

In the embodiment shown in FIG. 2 the intermediate waveguide 104 (dashed line in FIG. 2) is formed within the cladding 102. The first waveguide 101 and the second waveguide 103 are either surface waveguides (not shown) or are also embedded in the cladding 102.

In use of the waveguide structure 100 of the first specific embodiment, light is first coupled from the first waveguide 101, e.g. a silicon waveguide, to the intermediate waveguide 104. The light can then further be coupled from the intermediate waveguide 104 into the second waveguide 103, e.g. an III-V compound.

Alternatively, in use of the waveguide structure 100 of the first specific embodiment, light is first coupled from the second waveguide 103, e.g. an III-V compound, to the intermediate waveguide 104. The light can then further be coupled from the intermediate waveguide 104 into the first waveguide 101, e.g. a silicon waveguide.

According to the top view in FIG. 2 (b), the intermediate waveguide 104 has tapered ends 104e1 and 104e2 which are opposite sides having the smallest length/width. Preferably, the widest part of the intermediate waveguide 104 is physically arranged in the gap between the first waveguide 101 and the second waveguide 103. The intermediate waveguide 104 may not be symmetrical as an optimized taper to the first waveguide 101 as a medium index contrast waveguide will be different from the optimized taper to the second waveguide 103 as a high index contrast waveguide. The specific design of the taper from the wide central part to the tapered end, can vary depending on the compromise between optimal loss or shortest length. Generally the change in width along the length of the taper will not be constant.

Preferably, the intermediate waveguide 104 is a high index contrast waveguide and could comprise a bend (not shown). Therefore the first waveguide 101 is substantially parallel to the first tapered end 104e1 of the intermediate waveguide 104 and the second waveguide 103 is substantially parallel to the second tapered end 104e2 of the intermediate waveguide 104. Thus, there is no requirement for the first waveguide 101 to be parallel to the second waveguide 103.

In an alternative embodiment, the first waveguide 101 and the second waveguide 103 have the same extension direction and are also substantially parallel to another in the region where light is coupled from one waveguide to another waveguide. The second waveguide 103 is preferably distanced from the first waveguide 101 in its extension direction.

Figure 3:
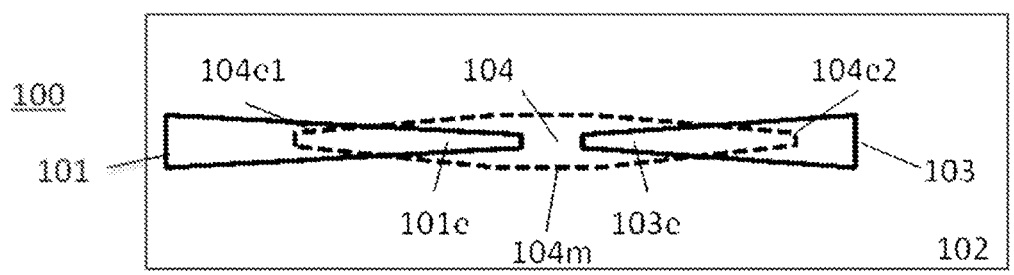
FIG. 3 shows a waveguide structure according to a second specific embodiment of the present invention.

FIG. 3 shows a second specific embodiment of the present invention, which builds on the basic embodiment shown in FIG. 1. Hereinafter, only the differences between FIG. 2 and FIG. 3 are explained. The embodiment according to FIG. 3 differs from the embodiment in FIG. 2 by the form of the intermediate waveguide 104 (reference is made to a top view form of FIG. 2 (b). According to the top view in FIG. 3, the intermediate waveguide 104 has tapered ends 104e1 and 104e2 which are opposite sides having the smallest length/width. In contrast to FIG. 2, the intermediate waveguide 104 comprises a middle section 104m that preferably comprises parallel sides. Alternatively (not shown) this middle section 104m is formed as a bend to allow a redirection of light into a non-parallel region of the chip. For improving the optical coupling, e.g. reducing coupling losses and decreasing power consumption of the waveguide structure 100, the first tapered end 104e1 might have alternative dimensions, such as a different width and/or length, than the second tapered end 104e2.

Figure 4:
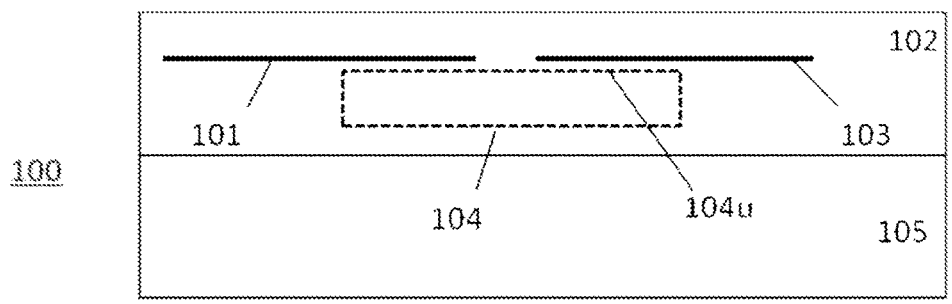
FIG. 4 shows a waveguide structure according to a third specific embodiment of the present invention.

FIG. 4 shows a third specific embodiment of the present invention, which builds on the basic embodiment shown in FIG. 1. The waveguide structure 100 is provided on a substrate 105. Preferably, the starting material is a silicon-on-insulator (SOI) wafer. This SOI wafer consists of a substrate 105, an oxide layer, which is the part of the cladding 102 between the substrate 105 and the intermediate waveguide 104 and finally a thin mono-crystalline layer, such as a thin silicon layer. The adjective "thin" in the expression "thin silicon layer" is to be intended relative to the dimensions of the waveguide structure or relative to the thickness of the substrate 105. For example, the thickness of the thin mono-crystalline layer will be less than 1 μm (and preferably in the range 200-400 nm) compared to a substrate 105 which would be normally be more than 300 um (and preferably 600-725 um for a 200 mm wafer) thick. This thin silicon layer is patterned to form the intermediate waveguide 104. The intermediate waveguide 104 is formed by patterning the thin top silicon layer. A more detailed description is provided with respect to FIGS. 5a to 5b and FIGS. 8a to 8j.

After forming the intermediate waveguide 104, same is planarized with a silicon dioxide layer as a cladding layer 102. In this case the planarization step is much easier because the step height created by the intermediate waveguide 104 is less than would likely be formed by the first waveguide 101. Further the first waveguide 101, preferably a SiN material, can then be deposited using a CVD technique instead of a wafer bonding step which would have been necessary to add a monocrystalline silicon layer above the SiN layer. The planarization requirements for a CVD deposition are relaxed compared to what is required to successfully wafer bond.

Figure 5A:
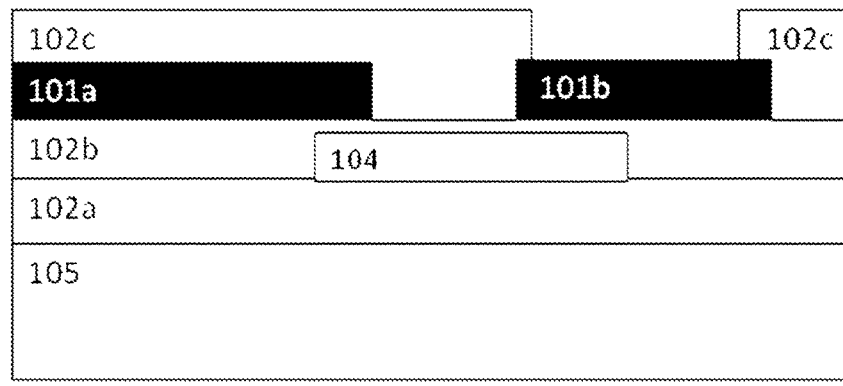
FIGS. 5a to 5b show a waveguide structure according to a fourth specific embodiment of the present invention.
Figure 5B:
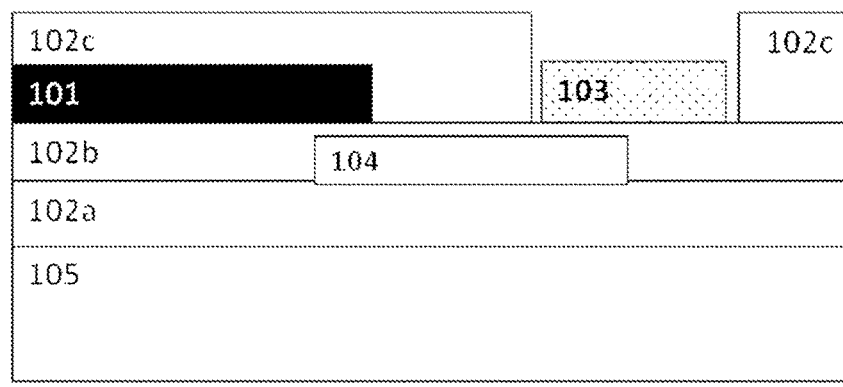

FIGS. 5a to 5b shows a fourth specific embodiment of the present invention, which builds on the basic embodiment shown in FIG. 1. The waveguide structure 100 is provided on a SOI wafer as described in FIG. 4.

This SOI wafer consists of a substrate 105, an oxide underclad layer 102a and a thin silicon layer. This thin silicon layer is patterned to form the intermediate waveguide 104. The substrate 105 preferably comprises a thickness of 725 μm. The underclad oxide layer 102a preferably comprises a thickness of 2 μm. The thin silicon layer preferably comprises a thickness in the range of 220 nm to 500 nm. The intermediate waveguide 104 is formed by patterning the thin top silicon layer.

According to FIG. 5a, the first waveguide 101, preferably a SiN material, is deposited using a CVD technique instead of a wafer bonding step. During the manufacturing process of the waveguide structure 100, the cladding 102 has been partly removed, wherein parts of the first waveguide 101b, preferably SiN based material, was used as an etch stop layer. Thus, the cladding layer 102 might be built with several layers 102a, 102b, 102c, wherein the unremoved parts of the cladding 102 form an upper cladding layer 102c that preferably embeds the first waveguide 101. The removal of the cladding 102 is especially applied at the area where the second waveguide 103 will be formed. The top cladding 102 can be removed using a removal process with a high selectivity to the etch stop layer.

According to FIG. 5b, the etch stop layer 101b is itself removed using a removal process with a high selectivity to the underlying cladding oxide. This creates a cavity in the top cladding 102c with a well defined oxide thickness still remaining above the intermediate waveguide 104. The second waveguide 103 can now be formed in the cavity. Optical coupling between the second waveguide 103 can be very efficient with well designed tapered ends as the oxide thickness is well controlled.

In use of the waveguide structure 100 of the fourth specific embodiment, light is transferred from the first waveguide 101 to the second waveguide 103 through the intermediate waveguide 104. The refractive index value of the intermediate waveguide 104 is much higher than the refractive index first waveguide 101 to prevent light loss from the intermediate waveguide 104 to the substrate 205.

The waveguide structure 100 including the first waveguide 101, the second waveguide 103, and the intermediate waveguide 104 is therefore a part of a single chip. That is, the waveguide structure 100 allows to combine a second waveguide 103 with a first waveguide 101 where the first waveguide 101 is optimized to make passive devices and the second waveguide 103 is optimized to make active devices.

For example, the first waveguide 101 may be SiN, while the second waveguide 103 may use an III-V material, like InP. The optical coupling between the two waveguides 101, 103 that have very different refractive indexes is obtained by coupling the light through the intermediate waveguide 104. For example, if the cladding 102 is $SiO_2$, the refractive index of the cladding 102 would be about 1.45.

An application for an exemplarily waveguide structure 100 according to the invention involves one or more passive devices fabricated, for example, by using high quality SiN waveguides as a first waveguide 101. Such passive devices have far superior performance to those fabricated using silicon waveguides. Additionally, the application comprises a integrating one or more active or passive device of a second waveguide 103, preferably an III-V material or a Si or a SiGe material.

In particular, an active device using Si and Ge materials is a waveguide photodetector. Current state-of-the-art PICs require waveguide detectors with bandwidth >30 GHz. For instance, Ge waveguide detectors fabricated on silicon waveguides can easily attain the required bandwidth. These devices can be fabricated separately together with an appropriate taper. Using transfer print techniques the completed photodetector can be removed from the wafer on which it was fabricated and transfer printed into the cavity where the top cladding was removed. The photodetector and appropriate taper waveguide thereby form the second waveguide (103). The waveguide structure 100 of the present invention provides a simple possibility to low-loss couple such a waveguide detector to a first waveguide 101, using e.g. SiN material. To this end, the waveguide detector is embedded on the same substrate 105 and thus is integrated on the same chip with minimal optical coupling losses. A similar approach is valid for modulators or other active devices, such as lasers, detectors, variable optical attenuators (VOAs) or heaters.

Transfer printing can be used particularly well for both SOI active devices and III-V active devices. For such active devices, once the active device processing is complete, transfer-printing techniques can release the top surface layers from the original substrate. The released layer may include any active device (e.g. a detector, a laser, a modulator or a heater). Therefore the second waveguide 103 may be of different materials at different places on the chip.

The coupling losses using waveguide structure 100, particularly when employing adiabatic coupling, produce fewer reflections than an alternative conventional butt coupling approach. Using this structure it is therefore easier to integrate lasers on chip as on-chip reflections between the laser source and the (off-chip) optical isolator are minimized.

Figure 6:
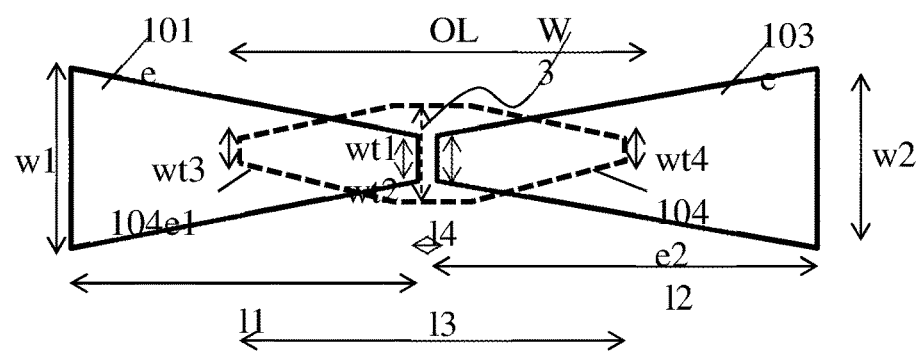
FIG. 6 shows a waveguide structure according to a fifth specific embodiment of the present invention.
Figure 6:
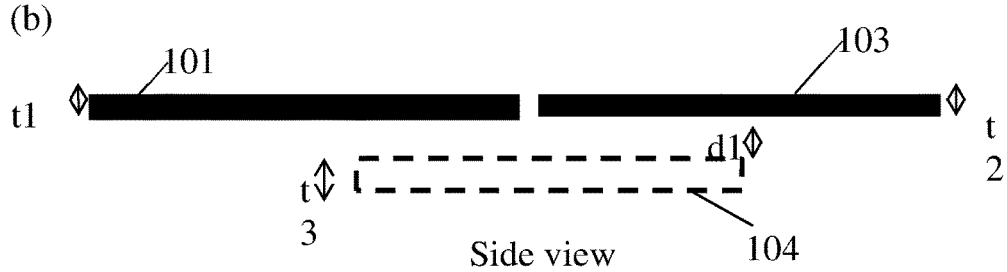

FIG. 6 shows a waveguide structure according to a fifth specific embodiment of the present invention, particularly coupling from/to a SiN first waveguide 101 to/from an III-V second waveguide 103 by means of an intermediate waveguide 104 (dashed line in FIG. 6).

That is, the first waveguide 101 and the second waveguide 103 are distanced from the intermediate waveguide 104 by a distance d1, which distance d1 corresponds accordingly to a corresponding thickness of a cladding 102 on top of the intermediate waveguide 104 after a planarization of this cladding 102. The distance d is preferably less than 250 nm, more preferably about 100 nm. The first waveguide 101 has a thickness t1, preferably in the range of 0.05 μm to 0.8 μm, more preferably 0.07 μm to 0.7 μm. The second waveguide 103 has a thickness t2, preferably in the range of 0.1 μm to 3 μm, more preferably 0.2 μm to 2 μm.

The tapered end 101e of the first waveguide 101 tapers from a waveguide width w1, preferably in the range of 0.4 μm to 2 μm, to a tapered end width wt1, preferably in the range of 0.1 μm to 2 μm, more preferably in the range of 0.1 μm to 1 μm. The tapering occurs (preferably linearly) over a length l1, which is preferably in a range of 150 μm to 800 μm. The tapered end 103e of the second waveguide 103 tapers from a waveguide width w2, preferably in the range of 1.0 μm to 2 μm, to a tapered end width wt2, preferably in the range of 0.15 μm to 0.8 μm, more preferably in the range of 0.15 μm to 0.5 μm and over a length l2, preferably in the same range as l1.

The first tapered end 104e1 of the intermediate waveguide 104 tapers from a waveguide width w3 to a tapered end width wt3. The width wt3 is preferably in a range of less than 0.15 μm.

The second tapered end 104e2 of the intermediate waveguide 104 tapers from a waveguide width w3 to a tapered end width wt4. The width wt4 is preferably in a range of 0.1 μm to 0.3 μm, more preferably in a range between 0.1 μm to 0.25 μm. The intermediate waveguide 104 comprises a length l3, which is preferably less than the sum of l1 plus l2.

The tapered ends 101e, 104e1, 104e2 and 103e overlap over a length OL. The length OL is preferably 1 mm or less, even more preferably about 400 μm or less, most preferably about 300 μm or less.

Using transfer-printing techniques, light can be transferred from a first waveguide 101 to a second waveguide 103 in a second transfer printed chip in less than 700 μm. The length is a function of the designed thickness d1. Larger values of d1 relax alignment tolerances but correspond to longer tapers. Smaller values of d1 allow shorter tapers at the expense of more critical alignment. The length is also a function of the patterning capability of the manufacturing process which forms the second waveguide 103. If the tip can be made smaller, the thickness of the intermediate waveguide can be reduced which will shorten the length of the taper to the first waveguide 101.

Figure 7A:
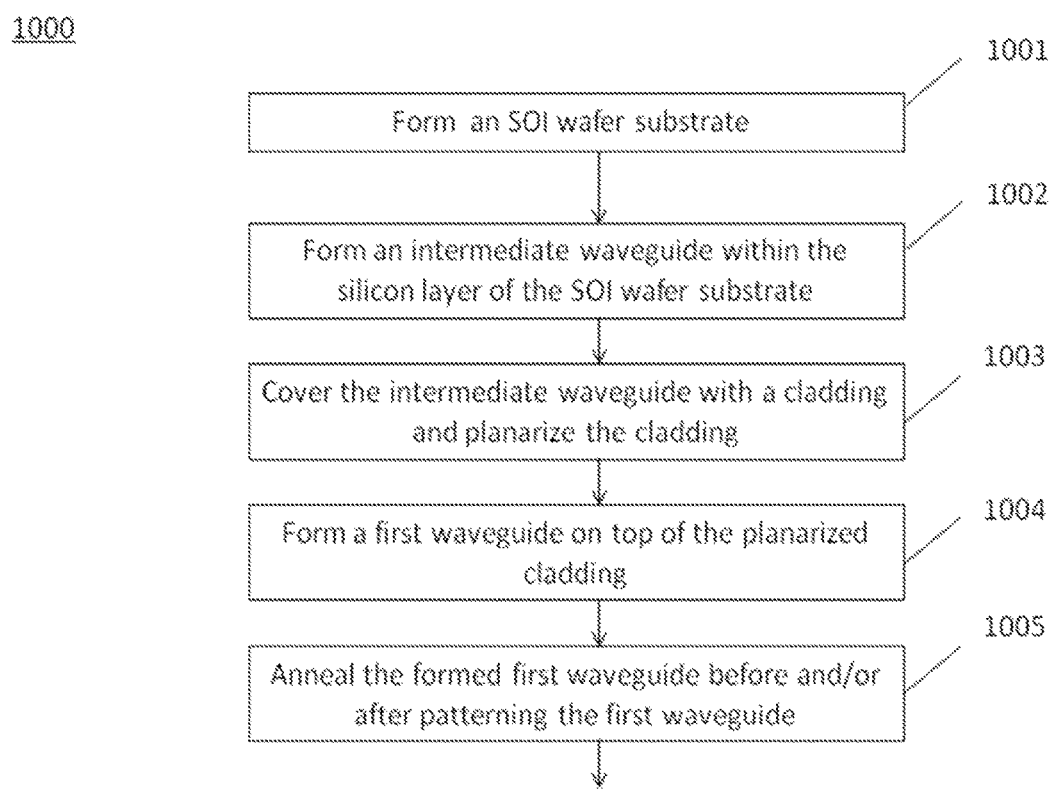
FIGS. 7a to 7b show a flow chart of a method according to an embodiment of the present invention.
Figure 7B:
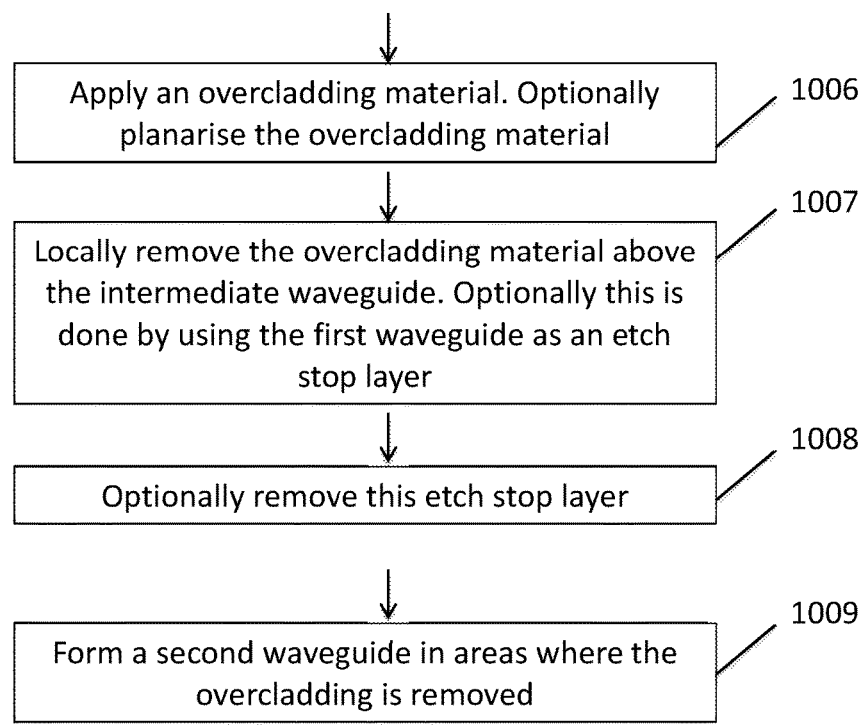

FIG. 7a and FIG. 7b show a flow chart of a method 1000 for fabricating a waveguide structure 100 for optical coupling. The starting point 1001 is a SOI wafer which is either formed or purchased from a supplier. The SOI wafer consists of a substrate 105, an oxide layer which will form part of the cladding 102a and a thin silicon layer which will be used to form the intermediate waveguide 104. In a second step 1002 the thin silicon layer is patterned. An intermediate waveguide 104 is formed within the thin silicon layer of the SOI wafer. Thus, the intermediate waveguide 104 is preferably a monocrystalline silicon intermediate waveguide 104. In a third step 1003, the intermediate waveguide 104 is covered with a cladding 102b which is subsequently planarized. The covering step 1003 is preferably obtained by using a silicon-dioxide layer.

In a fourth step 1004, a first waveguide 101 is formed on top of the planarized cladding 102b, wherein the cladding 102 comprises a lower refractive index than the first waveguide 101. The fourth step 1004, i.e. the formation of the first waveguide, is easier to perform compared to conventional methods because the first waveguide 101 can now be deposited using a CVD technique. If the first waveguide 101 had been formed first then a wafer bonding step may be utilized to add the monocrystalline silicon layer above the first waveguide 101 and the planarized oxide. Planarizing requirements prior to wafer bonding are very severe. Multiple masking procedures may be utilized to pattern the first waveguide 101, depending on the design of the passive optical devices which will be formed in the first waveguide layer 101.

In a fifth step 1005, the formed first waveguide 101 is annealed before and/or after patterning of the first waveguide 101. In the case of using SiN as the first waveguide material high temperature anneal processes are used, preferably with an annealing temperature above 1150 degrees Celsius, to reduce propagation loss in the SiN first waveguide 101. This is perfectly possible with a silicon intermediate waveguide 104 below the SiN first waveguide 101. This is because the intermediate waveguide 104 does not contain temperature sensitive structures e.g. semiconductor junctions and so on.

In a sixth step 1006, an overcladding material 102c is applied for embedding the first waveguide 101 in the waveguide structure 100. Optionally further anneals similar to step 1005 may be incorporated after deposition of all or part of the overclad material.

In a seventh step 1007, the overcladding material 102c is locally removed to a thickness less than 200 nm above the intermediate waveguide 104. The locally removal can be obtained by an etching procedure. To achieve thickness control the part of the first waveguide 101, can additionally be used as an etching-stop material 101b above the intermediate waveguide 104 and in the areas where the second waveguide 103 will be formed.

After locally removing the overcladding material 102c the etch stop layer 101b is also removed in an optional eight step 1008.

In a ninth step 1009, a second waveguide 103 is formed in areas where the overcladding material 102c is removed, wherein the second waveguide 103 comprises a higher refractive index than the overcladding 102c. The second waveguide 103 is preferably an III-V material or a Si or a SiGe material.

Using this scheme, any passive devices or active devices in the silicon intermediate waveguide 104 do not contain semiconductor junctions or other temperature sensitive features. Consequently the temperature budget for SiN first waveguide 101 processing is not restricted even with the silicon intermediate waveguide 104 already patterned. Thus, there is no problem to use high temperature processing to properly anneal the first waveguide and create a waveguide suitable for fabrication of high quality passive devices.

In FIGS. 8a to 8j, a stepwise manufacturing scenario for manufacturing a waveguide structure 100 according to the present invention is shown.

Figure 8A:
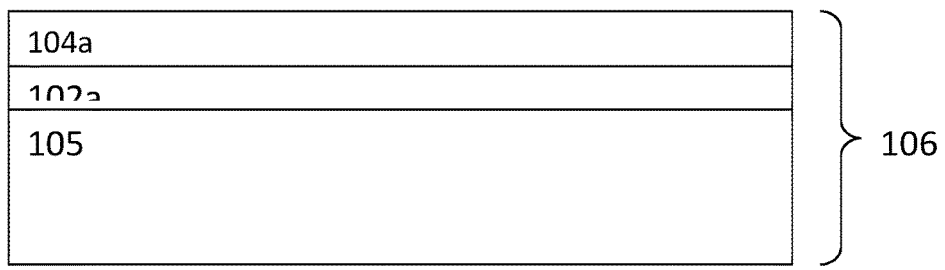

In FIG. 8a, the initial SOI wafer substrate 106 is shown as a starting material. This SOI wafer substrate 106 consists of a silicon substrate 105, a silicon dioxide layer 102a—also called underclad 102a—and a thin silicon layer 104a. This thin silicon layer 104a is patterned to form the intermediate waveguide 104.

Figure 8B:
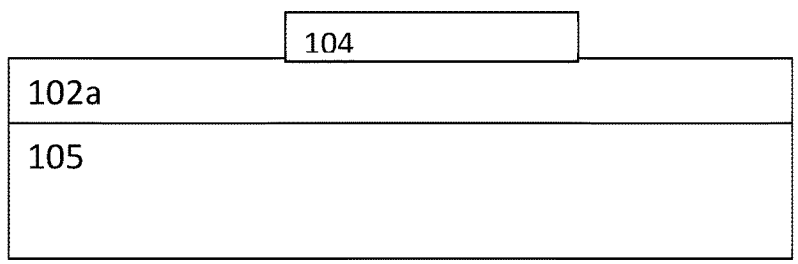

In FIG. 8b, the forming step 1002 is shown, in which the intermediate waveguide 104 is formed. The intermediate waveguide 104 is formed by patterning the top thin silicon layer 104a of the SOI wafer 106.

Figure 8C:
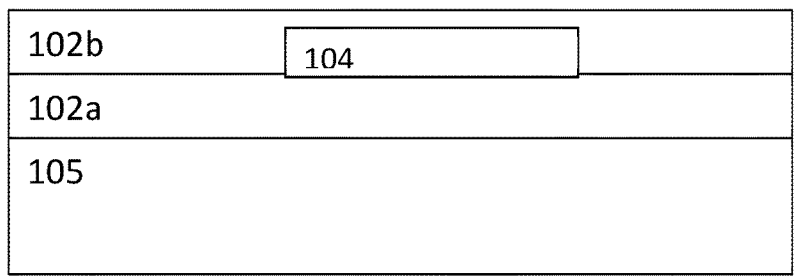

In FIG. 8c, the covering step 1003 is shown, in which the intermediate waveguide 104 is covered with a cladding 102b. This is done, after the silicon intermediate waveguide 104 is defined by the patterning procedure. The silicon intermediate waveguide 104 is thus planarized with a silicon dioxide $SiO_2$ cladding 102.

In FIG. 8d, the forming step 1004 is shown, in which the first waveguide 101 is formed on top of the planarized cladding 102. The SiN first waveguide 101 can be deposited using a CVD technique, preferably a LPCVD technique. Either prior to patterning and/or after patterning the first waveguide material can be annealed at high temperature in the annealing step 1005. High temperature anneal processes are used to reduce propagation loss in the SiN first waveguide 101. Note that after patterning the first waveguide material remains 101b in areas where the second waveguide 103 will subsequently be formed. In these areas the first waveguide material serves as an etch stop layer.

In FIG. 8e, an overcladding material 102c is added for embedding the first waveguide 101. In a preferred embodiment silicon dioxide is again used as the cladding material 102c.

In FIG. 8f, the overcladding material 102c is locally removed above the intermediate waveguide 104 according to step 1007. As the oxide thickness above the intermediate waveguide 104 should be well controlled an etch stop layer is utilized. However instead of using a separate layer and involving additional deposition and patterning processes the first waveguide material 101 is preferably used as the etch stop material. The overcladding oxide etch process is designed to be selective to the first waveguide material and therefore 'stops' on the SiN first waveguide 101.

Figure 8G:
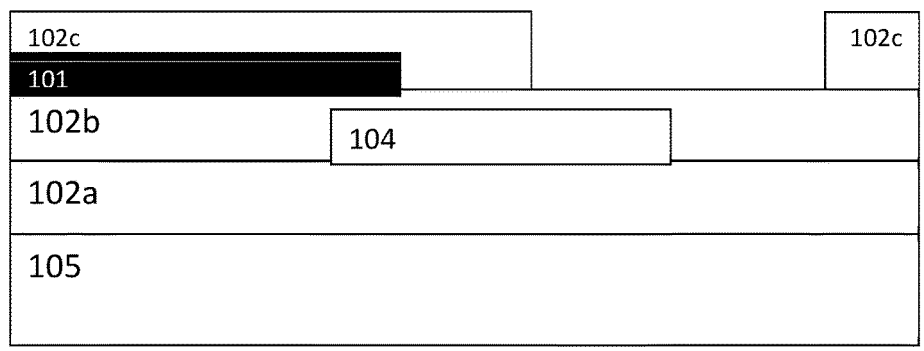

In FIG. 8g, then the SiN waveguide 101 can be removed leaving the intermediate waveguide 104 covered with a thin planarizing oxide and ready for placement of the III-V or Si/SiGe active device—the second waveguide 103.

Figure 8H:
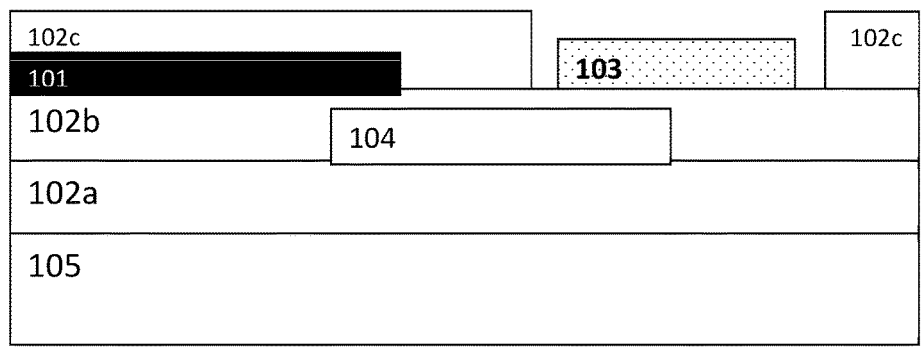

In FIG. 8h, the forming step 1008 for forming the second waveguide 103 is shown. The second waveguide 103 is formed in areas where the overcladding material 102c has been removed. Using transfer printing techniques a second waveguide structure can be fabricated separately containing the desired active device with appropriate waveguide taper and transfer printed onto the chip. Alternatively an appropriate starting material for the active device can be bonded into position and the active device formed by subsequent processing steps.

Figure 8I:
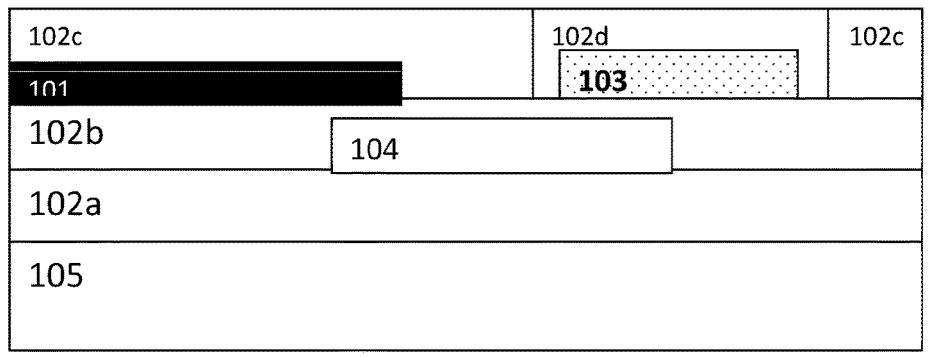
Figure 8J:
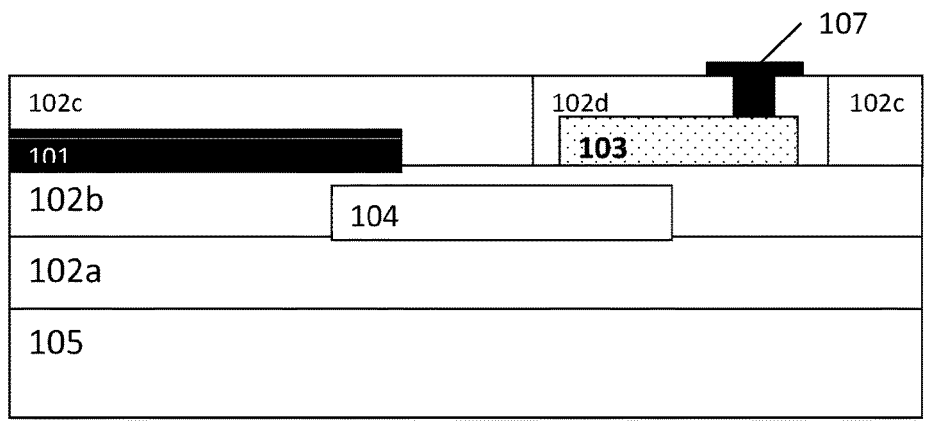

Optionally the processing steps as shown and described in FIG. 8i and FIG. 8j can be performed.

In FIG. 8i, the cavity in the cladding 102c is filled with further cladding material 102d and planarized. This material has a refractive index lower than the intermediate waveguide 104 or second waveguide 103. This may be silicon dioxide or an appropriate polymer. As the active devices are already defined the temperature budget for these and subsequent process steps are limited.

In FIG. 8j, a contact or a via hole is made in the further cladding material 102d and an electrical connection 107 is thus made from the planarized top surface to the active devices formed in the second waveguide material 103.

An advantage of the last planarization and contact steps is that the wafer can be made suitable for close integration of electronics to the PICs by techniques such as flip-chip, stud bumping or 2.5D or 3D integration. Without these steps wire bonds should be used to contact the active devices.

The relevant wavelength ranges, in which the invention might preferably operate in are either: the O-band with a range from 1260 nm to 1360 nm, chosen because dispersion in fiber is lowest at 1310 nm, e.g. a data-centre-rack to rack, LAN WDM or CWDM; the C-band with a range from 1520 nm to 1570 nm, chosen because propagation loss in optical fiber is lowest around 1550 nm or optical amplifiers with erbium doped fiber work around 1550 nm; and/or L-band with a range from 1570 nm to 1610 nm. An extension of the C-band is made possible when optical amplifiers could work at this wavelength.

Using this method, the adiabatic coupling between the waveguides 101, 103 have optical coupling losses of ~0.2 Decibel over such wide wavelength ranges. Using this method, the processing is much simpler and therefore cheaper and higher yield.

Of course it is also possible to monolithically integrate a SiN first waveguide 101 with active devices fabricated in silicon, e.g. germanium detectors.

The placement of the III-V device, e.g. by transfer print, is not a standard CMOS process. However, this integration approach offers both electro-absorption modulator (EAM) devices for the O-band and the possibility of integrated lasers.

By comparing the conventional SOI integration with this inventive approach, it should be noted that the inventive approach utilizes separate formation of the active devices but then only 5 to 8 masking procedures whereas the conventional SOI method needs 25 to 34 masking procedures. With the inventive solution it is now possible to provide a waveguide structure 100 that is integrated with simpler and therefore cheaper processing. To obtain comparable quality SiN waveguide 101 on a conventional basis and combine with SOI active devices using monolithic integration techniques a wafer bond step is needed, whereas according to the invention, this difficult step is eliminated.

Using this invention allows SiN passive devices to be combined with both III-V active devices and SOI active devices on an integrated platform. This is ideal for O band data center applications requiring photodetectors with high bandwidth (best executed in SOI as SiGe detectors), EA modulators (not possible with SOI in O band) and high quality wavelength-division multiplexing (WDM) filters (now possible with silicon or InP waveguides without heaters and other tuning aids). The method also enables close integration of the electronics which will result in much lower power consumption with appropriate electronics. III-V active devices have clear advantages over SOI actives in O-band coarse WDM (CWDM) and LAN WDM (LWDM) applications. No wafer bond step is needed to get mono-crystalline silicon above the SiN first waveguide 101. The planarization does not need to be as excellent as required for a wafer bond step, since a LPCVD technique can be applied to form the first waveguide 101 above the intermediate waveguide 104. The first waveguide 101 can act as an etch stop when removing the overcladding 102 above the intermediate waveguide 104. The silicon photonics processing is straightforward and comprises only 4 to 5 mask steps. It can be transferred to an advanced CMOS fabrication without difficulty, because the active device is fabricated in an III-V fabrication and the planarization/interconnect can be done in a cheaper MEMS fabrication.

With the present invention, a new coupling scheme is presented, which is suitable particularly for optical coupling of an III-V and/or Si and/or SiGe device with a SiN waveguide 101 without significant optical losses. The waveguide structure 100 is optimized for coupling a SiN waveguide 101 for passive optical functions to an active device in III-V and/or Si and/or SiGe technology with low optical coupling loss. The coupling scheme of the present invention is compatible with conventional CMOS technology.

The present invention has been described in conjunction with various embodiments as examples as well as implementations. However, other variations can be understood and effected by those persons skilled in the art and practicing the claimed invention, from the studies of the drawings, this disclosure and the independent claims. In the claims as well as in the description the word "comprising" does not exclude other elements or steps and the indefinite article "a" or "an" does not exclude a plurality. A single element or other unit may fulfill the functions of several entities or items recited in the claims. The mere fact that certain measures are recited in the mutual different dependent claims does not indicate that a combination of these measures cannot be used in an advantageous implementation.

Additionally, statements made herein characterizing the invention refer to an embodiment of the invention and not necessarily all embodiments.

What is claimed is:

1. A waveguide structure for optical coupling between passive and active devices, the waveguide structure comprising:
   a SiN waveguide embedded in a cladding of a lower refractive index than the SiN waveguide, wherein the SiN waveguide operates in relevant wavelength ranges of (a) a 0-band with a range from 1260 nm to 1360 nm, (b) a C-band with a range from 1520 nm to 1570 nm, and/or (c) a L-band with a range from 1570 nm to 1610 nm;

a III-V waveguide of a higher refractive index than the cladding and is fabricated with an active device prior to transferring the III-V waveguide to a photonic integrated circuit;

an intermediate waveguide arranged with respect to the SiN waveguide and the waveguide to be at a same side of the intermediate waveguide; and an optical coupling between the SiN waveguide and the waveguide through the intermediate waveguide.

2. The waveguide structure according to claim 1, wherein the SiN waveguide and the waveguide each comprise a tapered end;

the intermediate waveguide comprises two tapered ends;

the tapered end of the SiN waveguide is arranged to face a first tapered end of the intermediate waveguide for establishing the optical coupling between the SiN waveguide and the intermediate waveguide, wherein the SiN waveguide and the intermediate waveguide extend at least substantially parallel to each other in one direction and the tapered end of the SiN waveguide overlaps with the first tapered end of the intermediate waveguide in the extension direction; and a second tapered end of the intermediate waveguide is arranged to face the tapered end of the III-V waveguide for establishing an optical coupling between the intermediate waveguide and the III-V waveguide, wherein the III-V waveguide and the intermediate waveguide extend at least substantially parallel to each other in one direction, and the tapered end of the III-V waveguide overlaps with the second tapered end of the intermediate waveguide in the extension direction, wherein the extension direction refers to the tapered ends of the waveguides through each of which an optical coupling between waveguides is established, will extend in the same direction so as to run essentially parallel or extend along the same direction.

3. The waveguide structure according to claim 2, wherein the SiN waveguide has a thickness in the range of 70 nm to 700 nm, the tapered end of the SiN waveguide at its thinnest part having a width in the range of 100 nm to 2 μm.

4. The waveguide structure according to claim 2, wherein the intermediate waveguide has a thickness in the range of 200 nm to 500 nm, the first tapered end of the intermediate waveguide having a width less than 150 nm, and the second tapered end of the intermediate waveguide having a width in the range of 100 nm to 300 nm.

5. The waveguide structure according to claim 2, wherein the III-V waveguide has a thickness in the range of 200 nm to 2 μm, the tapered end of the III-V waveguide at its thinnest part having a width in the range of 150 nm to 500 nm.

6. The waveguide structure according to claim 1, wherein the intermediate waveguide is formed using a mono-crystalline layer of a silicon-on-insulator wafer substrate, wherein the SiN waveguide and the III-V waveguide are arranged on a side of the intermediate waveguide that is opposite to the side facing the silicon-on-insulator wafer substrate.

7. The waveguide structure according to claim 1, wherein the SiN waveguide has a refractive index of 1.7 or higher.

8. The waveguide structure according to claim 1, wherein the SiN waveguide has a refractive index in the range of 1.7 to 2.5.

9. A method for fabricating a waveguide structure for optical coupling, the method comprising:

forming a silicon-on-insulator wafer substrate;

forming an intermediate waveguide within a thin silicon layer of the silicon-on-insulator wafer substrate;

covering the intermediate waveguide with a cladding and planarizing the cladding;

forming a SiN waveguide on top of the planarized cladding, wherein the cladding comprises a lower refractive index than the SiN waveguide and the SiN waveguide has a relevant operating wavelength ranges of (i) a 0-band with a range from 1260 nm to 1360 nm, (ii) a C-band with a range from 1520 nm to 1570 nm, and/or (iii) a L-band with a range from 1570 nm to 1610 nm;

annealing the formed SiN waveguide before and/or after patterning of the SiN waveguide;

applying an overcladding material for embedding the SiN waveguide;

locally removing the overcladding material to a thickness less than 200 nm above the intermediate waveguide; and forming a III-V waveguide in an area where the overcladding material is removed, wherein the III-V waveguide comprises a higher refractive index than the overcladding and is fabricated with an active device prior to transferring the III-V waveguide to a photonic integrated circuit.

10. The method according to claim 9, wherein locally removing the overcladding material comprises locally using the SiN waveguide as an etch stop layer before the overcladding material is locally removed.

11. The method according to claim 9, wherein the SiN waveguide layer is a Low Pressure Chemical Vapor Deposition (LPCVD) silicon nitride layer.

12. The method according to claim 9, wherein the III-V waveguide is formed using transfer printing.

13. The method according to claim 9, wherein the III-V waveguide is formed by bonding epitaxial layers of III-V material.

14. The method according to claim 9, wherein a further planarizing step to the wafer is applied after the III-V waveguide has been formed and contacts to any active device formed in the III-V waveguide layer are then added.

* * * * *